(12) United States Patent
Lindsley (10) Patent No.: US 7,689,993 B2
(45) Date of Patent: Mar. 30, 2010

(54) ASSIGNING TASKS TO PROCESSORS BASED AT LEAST ON RESIDENT SET SIZES OF THE TASKS

(75) Inventor: Richard Lindsley, Aloha, OR (US)

(73) Assignee: International Business Machines Corporation, Armonk, NY (US)

( * ) Notice: Subject to any disclaimer, the term of this patent is extended or adjusted under 35 U.S.C. 154(b) by 1515 days.

(21) Appl. No.: 11/004,325

(22) Filed: Dec. 4, 2004

(65) Prior Publication Data

US 2006/0150189 A1  Jul. 6, 2006

(51) Int. Cl.
G06F 9/46 (2006.01)
G06F 13/00 (2006.01)
G06F 13/28 (2006.01)

(52) U.S. Cl. .................. 718/102; 711/152; 711/170

(58) Field of Classification Search ............. 718/1–108; 711/141, 147, 148, 152, 170, 203
See application file for complete search history.

(56) References Cited

U.S. PATENT DOCUMENTS

| 5,093,913 | A | * | 3/1992 | Bishop et al. ............... 711/152 |
| 5,115,505 | A | * | 5/1992 | Bishop et al. ............... 718/104 |
| 5,237,673 | A | | 8/1993 | Orbits et al. |
| 5,269,013 | A | | 12/1993 | Abramson et al. |
| 5,303,369 | A | | 4/1994 | Borcherding et al. |
| 5,349,656 | A | | 9/1994 | Kaneko et al. |
| 5,918,249 | A | | 6/1999 | Cox et al. |
| 6,219,690 | B1 | | 4/2001 | Slingwine et al. |
| 6,269,390 | B1 | | 7/2001 | Boland |
| 7,149,863 | B1 | * | 12/2006 | Chew et al. ................ 711/170 |
| 2004/0019891 | A1 | * | 1/2004 | Koenen ...................... 718/102 |
| 2005/0240748 | A1 | * | 10/2005 | Yoder ........................ 711/170 |

FOREIGN PATENT DOCUMENTS

| JP | 6119300 A | 3/1992 |
| JP | 4338837 A | 11/1992 |

OTHER PUBLICATIONS

Farach-Colton M, et al., On local Register Allocation, Academic Press, Oct. 2000, vol. 37, No. 1, pp. 37-65 (Inspec Abstract Only).
Franaszek et al., Time Scheduler for Multiple Processors, IBMTDB, v 36, n 2, Feb. 1993, pp. 111-114 (Inspec Abstract Only).

* cited by examiner

*Primary Examiner*—Meng-Ai An
*Assistant Examiner*—Willy W Huaracha
(74) *Attorney, Agent, or Firm*—Steven Lieske Bennett (57) ABSTRACT

Tasks are assigned to processors of a system. The resident set size of each task is determined, specifying the amount of physical information allocated thereto, and locational information of this memory with respect to the processors is determined. Each task is assigned one processor, based on the task's resident set size, and the locational information of the task's allocated physical memory. Each task is attempted to be assigned to the processor closest to the largest portion of the physical memory allocated thereto. A number of the tasks may be determined as best suited to run on a given processor, but the given processor may be unable to run them all. The processor may be thus assigned only those tasks that have a greatest amount of physical memory allocated that is closest to the processor, such as the greatest amount or percentage of physical memory allocated that is local to the processor.

14 Claims, 4 Drawing Sheets

ASSIGNING TASKS TO PROCESSORS BASED AT LEAST ON RESIDENT SET SIZES OF THE TASKS

FIELD OF THE INVENTION

The present invention relates generally to determining which tasks should be executed by which processors, and more particularly to make such a determination based at least on the resident set sizes of the tasks.

BACKGROUND OF THE INVENTION

A multiple-processor computer system is a system that has more than one processor. Each processor may have associated memory that nevertheless is accessible by all the processors within the system. The memory associated with a given processor is generally the closest memory to the given processor, such that the memory of the other processors is farthest away from the given processor, either physically and/or temporally. The memory of a given processor within a multiple-processor system can be considered memory that is local to the given processor. The memory of the other processors within the system is thus considered memory that is remote to the given processor.

Computer programs that are executed or run on a computer system each usually have one or more tasks or processes that make up the program. In a multiple-processor computer system, a special sub-system of the operating system, known as a scheduler, assigns tasks to run on particular processors of the computer system. Therefore, each task or process is assigned a particular processor on which to run. Generally, the scheduler assigns tasks to different processors depending on their availability. A processor that has few tasks running on it as compared to the other processors of the system is thus a candidate for being assigned additional tasks.

A task or process is usually allocated both virtual memory as well as physical memory for it to be run properly. The virtual memory allocated for the task or process is a portion of the total addressable memory of the system, where the total addressable memory of the system may be greater than the physical memory of a system. For example, a given computer system may be able to address four gigabytes of memory, but only have three gigabytes of physical memory. The gigabyte of addressable memory that does not correspond to physical memory can be written onto a storage device, such as a hard disk drive. When some of this gigabyte of addressable memory is needed by a processor, the contents of some of the physical memory are written out onto the storage device, and the contents of some of the addressable memory previously stored on the storage device are read into physical memory. In this way, a computer system can have more total memory that can be used by tasks than it has actual physical memory.

The amount of actual physical memory in use by a given task or process is referred to as the resident set size of the task. While the amount of total memory assigned to the task may be greater than the resident set size, the resident set size specifies how much physical memory the task is actually using at a particular point in time. The physical memory assigned to the task, in accordance with its resident set size, may be located anywhere within a computer system, depending on where the operating system is able to find available physical memory for the task. In a multiple-processor computer system, this means that the task may be allocated portions of physical memory that are local to different processors. A large portion of the physical memory allocated to a task, for instance, may be local to one processor, whereas the remaining portion of the physical memory allocated to the task may be local to another processor.

The scheduler of an operating system of a multiple-processor computer system typically does not take into consideration the location of a task's allocated physical memory when selecting a processor to which to assign the task for execution. For example, a multiple-processor computer system may have two processors. A task's allocated physical memory may be local to the first processor, but the task may be assigned to the second processor. Such a situation can detrimentally affect the performance of the task. Each time the second processor requires information stored in the memory allocated to the task that is local to the first processor, it may have to communicate with a sub-system handling memory accesses for the local memory of the first processor. Such communication can slow down execution of the task.

For example, when the second processor determines that it needs information stored in the memory allocated to the task that is local to the first processor, the second processor first determines whether it has locally cached this information, and whether the locally cached version of this information is still valid. If the second processor has not locally cached the information, or the locally cached version of the information is invalid, then the second processor must issue a request that traverses the computer system, to the sub-system that handles memory accesses for the local memory of the first processor. The sub-system retrieves the requested information, and sends it back to the second processor. Until the second processor receives the requested information, it may not be able to continue executing the task, slowing down performance. Furthermore, in some computer systems, the first processor itself may be involved in retrieving the information from its local memory and sending it back to the second processor, which slows down performance of tasks running on the first processor.

A limited solution to this problem within the prior art is to attempt to assign tasks to the processors that most recently have cached the memory allocated to the tasks. This approach at task assignment can be referred to as a "cache-warmth" approach, because the processor that has the most "warm" cache entries for a given task—that is, the processor that has previously cached the most information relating to the memory of a previous execution of the task—is assigned the task for its next execution. Warm cache entries are cache entries that pertain to a given task that have not yet been flushed out of the cache by newer cache entries, even though the task in question may have already ended its execution. Each processor of a multiple-processor system typically has an associated cache, which can be used to temporarily store information of memory that is remote to the processor, as well as to temporarily store information of memory that is local to the processor, but that has been requested by other processors. The theory behind the cache-warmth approach is that the processor that has the most warm cache entries for a previous execution of a task is likely to have as local memory most of the physical memory allocated to the task, such that this processor should be assigned the next execution of the task.

However, the cache-warmth approach can fail in at least two situations. First, the warm cache entries may be quickly flushed from a given processor's cache, due to the need by the processor to cache other portions of memory. Therefore, the cache-warmth approach may be unable to select a processor having warm cache entries for a previous execution of a task. This situation is indeed likely to occur where task performance can be critical, within multiple-processor computer systems that are running at full capacity, such that the large number of tasks running causes the caches to become flushed quickly.

Second, the processor having the most warm cache entries for a previous execution of a task may not have as local memory most of the physical memory allocated to the task. For example, a first processor may have as local memory none of the physical memory allocated to the task, and the physical memory allocated to the task may be relatively equally divided among the local memory of each of second, third, and fourth processors. In this situation, the first processor is nevertheless most likely to have more warm cache entries for the task, because it will have cached more memory pertaining to the task than any other processor, even though the first processor does not have any local memory that has been allocated to the task. The second, third, and fourth processors, by comparison, will have cached less memory pertaining to the task, since each of these processors has as its local memory only a minority of the physical memory allocated to the task in accordance with the task's resident set size. As a result, the cache-warmth approach would pick the first processor for the next execution of the task, even though this is the worst processor to select for performance reasons.

For these and other reasons, therefore, there is a need for the present invention.

SUMMARY OF THE INVENTION

The invention relates generally to assigning tasks, or processes, to processors of a multiple-processor computer system based at least on the resident set sizes of the tasks. A method of the invention, for each task to be run on the processors of a system, determines the resident set size of the task, which specifies the amount of physical information allocated to the task at that point in time, and also determines locational information of this amount of physical memory with respect to the processors. For example, the locational information of the physical memory allocated to the task may include with which processor each portion of this physical memory is associated, and thus to which processor each portion of memory is local. The method next assigns each task one processor on which to run, based on the resident set size of the task, and on the locational information of the physical memory allocated to the task. The method attempts to assign each task to the processor that is closest to the largest portion of the physical memory currently allocated to the task. For example, each task may be assigned to the processor that has as local memory the largest portion of the physical memory allocated to the task.

In one embodiment, a number of the tasks may be determined as most suitable for running by a given processor, but the given processor may be at near-full capacity already, and unable to run all of the tasks. Therefore, the processor may be assigned just those tasks that have a greatest amount of physical memory allocated that is closest to the processor, such as the greatest amount of physical memory allocated that is local to the processor. Alternatively, the processor may be assigned just those tasks that have a greatest percentage of physical memory allocated that is closest to the processor, such as the greatest percentage of physical memory allocated that is local to the processor.

A system of the invention includes a number of processors, physical memory, and an operating system. The physical memory is divided into memory portions corresponding to the processors. The memory portion corresponding to each processor is local to that processor, and remote to all of the other processors. The operating system is to allocate an amount of the physical memory to a task based on the resident set size of the task. Furthermore, the operating system is to assign the task to one of the processors based on the resident set size of the task, and on locational information regarding the physical memory allocated to the task. A special subsystem that is part of the operating system and that is referred to as a scheduler may perform the task assignment functionality.

An article of manufacture of the invention includes a computer-readable medium and means in the medium. The computer-readable medium may be a recordable data storage medium, a modulated carrier signal, or another type of computer-readable medium. The means is for selecting one of a number of tasks to run on a selected processor, based at least on a resident set size of the task and locational information of an amount of physical memory allocated to the task. The task selected may be that which has a largest amount of physical memory closest to the selected processor. In all embodiments of the invention, the physical memory that has been referred to may be and preferably is non-cache physical memory.

Embodiments of the invention provide for advantages over the prior art. A task is allocated physical memory within a multiple-processor computer system that may include portions of physical memory that are local to different processors. Embodiments of the invention attempt to assign the task to the processor to which the largest portion of the physical memory allocated to the task is local. Such predictive task assignment ensures that whenever possible, the processor having as its local memory the largest portion of the physical memory allocated to a given task is assigned the task. As such, performance is maximized. This is because the processor having as its local memory the largest portion of the physical memory allocated to a given task is the processor that will more than likely require the least number of remote memory accesses to execute the task. Because this processor has as its local memory the largest portion of the physical memory allocated to the task, as compared to any other processor of the system, it will need to access the local memory of other processors the least in executing the task. The reduction in remote memory accesses by the processors of the system thus improves performance of the system as a whole.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
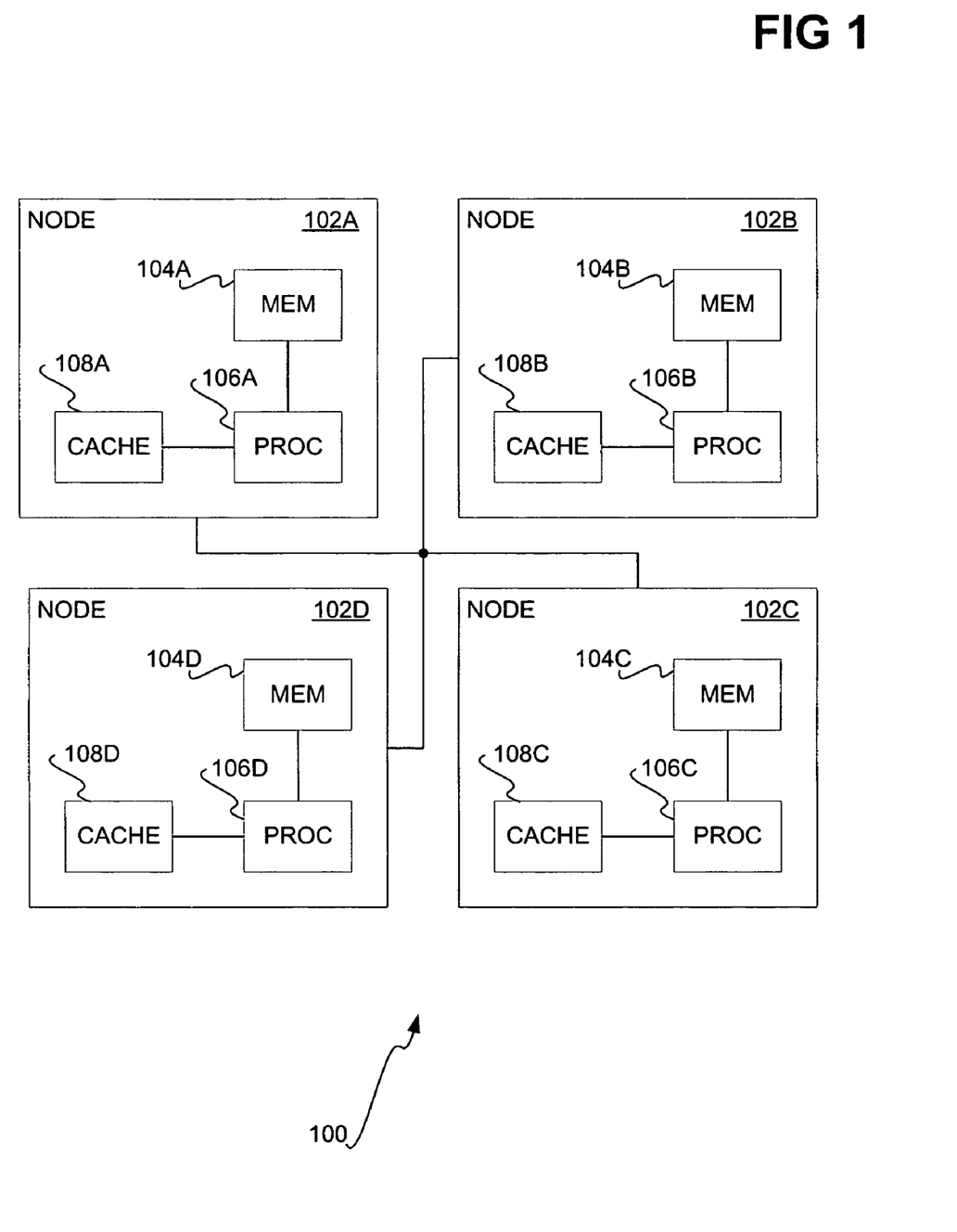
FIG. 1 is a rudimentary diagram of one view of a multiple-processor computer system, according to an embodiment of the invention.

FIG. 1 shows a rudimentary multiple-processor system 100, according to an embodiment of the invention. The system 100 includes nodes 102A, 102B, 102C, and 102D, which are communicatively connected to one another, and which are collectively referred to as the nodes 102. Each of the nodes 102 has memory, a processor, and a cache. The node 102A has memory 104A, the processor 106A, and the cache 108A. The node 102B has memory 104B, the processor 106B, and the cache 108B, whereas the node 102C has memory 104C, the processor 106C, and the cache 108C. Likewise, the node 102D has memory 104D, the processor 106D, and the cache 108D. The memories 104A, 104B, 104C, and 104D are collectively referred to as the non-cache physical memory 104 of the system 100. The processors 106A, 106B, 106C, and 106D are collectively referred to as the processors 106, and the caches 108A, 108B, 108C, and 108D are collectively referred to as the caches 108.

The memory of each of the nodes 102 is local to the node and to the processor of that node, and is remote to the other nodes and to the other processors. For example, the memory 104A is local to the node 102A and to the processor 106A, but is remote to the nodes 102B, 102C, and 102D, and to the processors 106B, 106C, and 106D. The local memory of a node and of its processor is located closer to that node and to that processor, as compared to the other nodes and their processors, physically and/or temporally. For example, the memory 104B that is local to the node 102B and to the processor 106B is located closer to the node 102B and to the processor 106B, physically and/or temporally, as compared to its location vis-à-vis the locations of the nodes 102A, 102C, and 102D, and the locations of the processors 106A, 106C, and 106D. Temporal closeness in this context means that a processor accesses temporally close memory more quickly than it does temporally distant memory.

A processor of each of the nodes 102 is able to access its local memory more quickly than the local memory of the other nodes that is remote to it. For example, the processor 106A is able to access its local memory 104A faster than the memories 104B, 104C, and 104D, which are remote memory to the processor 106A. In one embodiment, the processor 106A does the following to access its local memory 104A. First, it determines whether the memory location of the local memory 104A in question has been cached within the cache 108A, and if so, whether the cache entry for the memory location is valid. If so, then the processor 106A obtains the contents of this memory location from the cache 108A. If not, then the processor 106A obtains the contents of this memory location from the memory 104A, and then caches the contents within a cache entry within the cache 108A for future usage. The processor 106A thus does not have to communicate with the other nodes 102B, 102C, and 102D to access its memory 104A.

Furthermore, in one embodiment, the processor 106A does the following to access the memories 104B, 104C, and 104D that are remote to the processor 106A, which is described in particular relation to the memory 104B. First, it determines whether the memory location of the memory 104B in question has been cached within its cache 108A, and if so, whether the cache entry for the memory location is valid. If so, then the processor 106A obtains the contents of this memory location from the cache 108A. If not, then the processor 106A sends a request to the node 102B for the contents of this memory location. The node 102B receives the request. In one embodiment, the processor 106B determines whether the memory location in question has been cached within the cache 108B. If so, then the processor 106B sends the contents of the memory location, from its cache 108B, back to the processor 106A. Otherwise, the processor 106B retrieves the contents of the memory location from the memory 104B, and sends it to the processor 106A. The processor 106A thus has to communicate with the node 102B to access the memory 104B, where it has not cached a particular memory location of the memory 104B within its cache 108A. Therefore, in general, each of the processors 106 is able to access its local memory more quickly than its remote memory.

The caches 108 thus exemplarily serve two purposes, as is described in relation to the cache 108A. First, the cache 108A caches memory locations within any of the memory 104 for use by the processor 106A. That is, the cache 108A caches memory locations within the memory 104A that is local to the processor 106A, as well as memory locations within the memories 104B, 104C, and 104D that are remote to the processor 106A, for use by the processor 106A. Second, the cache 108A caches memory locations within the memory 104A that have been requested by the other nodes 102B, 102C, and 102D, for use by the processors 106B, 106C, and 106D, and thus not necessarily specifically for use by the processor 106A.

It is noted that the rudimentary system 100 that is shown in FIG. 1 is particular to one embodiment of the invention, and not all embodiments of the invention, and that other components may be included within the system 100, in addition to and/or in lieu of those depicted in FIG. 1. Each of the nodes 102 may have more than one processor, for example. Furthermore, four nodes 102 are shown in FIG. 1, but there may be as few as one node 102, if it contains more than one processor, as well as more than four nodes 102. In addition, the system 100 has been described such that each of the processors 106 are themselves directly responsible for handling requests from other of the processors 106 regarding their own local memories. In another embodiment, however, there may be a memory controller within each of the nodes 102 that handles these requests. There may also be cache controllers within the nodes 102 to maintain the consistency and coherency of the caches 108. The system 100 may in one embodiment of the invention be a non-uniform memory architecture (NUMA) system.

Figure 2:
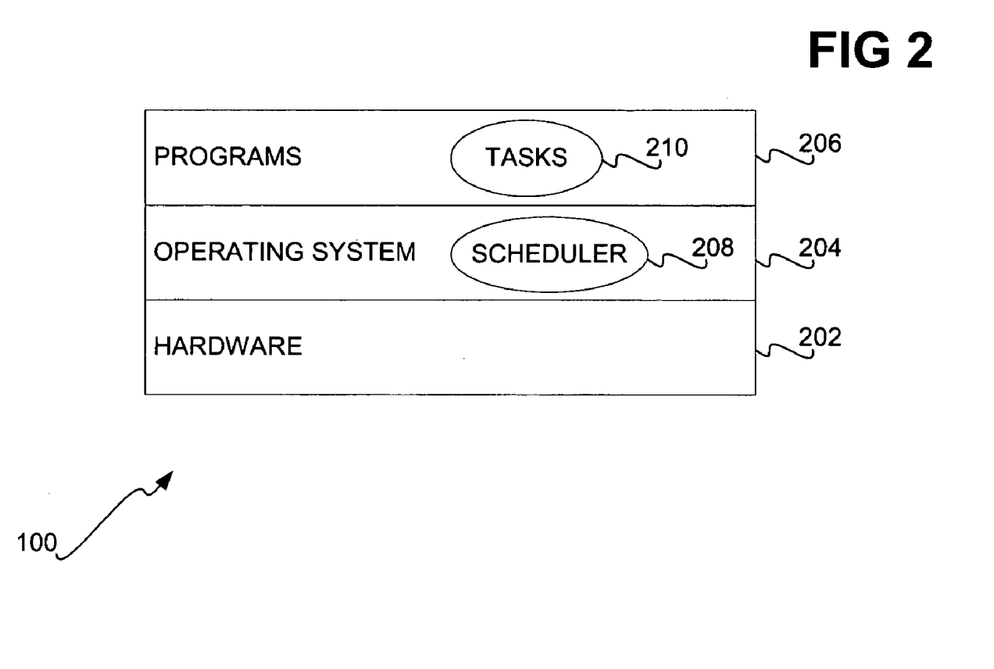
FIG. 2 is a rudimentary diagram of another view of a multiple-processor computer system, according to an embodiment of the invention.

FIG. 2 shows another view of the system 100, according to an embodiment of the invention. The system 100 that is depicted in FIG. 2 is being made up of a layer of hardware 202, a layer including the operating system 204, and a layer of the computer programs 206 running on the system 100. As can be appreciated by those of ordinary skill within the art, there may be layers within the system 100 in addition to and/or in lieu of those depicted in FIG. 2. Furthermore, the layers depicted in FIG. 2 may have sub-layers that are not shown in FIG. 2. The view of the system 100 depicted in FIG. 2 is a diagrammatical view of the system 100, in which the components thereof depicted in FIG. 1, such as the memory 104, processors 106, and the caches 108, reside on the bottom layer in FIG. 2, as part of the hardware 202.

The operating system 204 is a special computer program, and is specifically the master control program that runs the computer system 100. There may be one operating system 204 over all of the nodes 102 of FIG. 1, or alternatively there may be an instance of the operating system 204 for each of the nodes 102. The operating system 204 is typically the first program loaded when the system 100 is turned on. The operating system 204 sets the standards for all the computer programs 206 that run on the system 100. The programs 206 communicate with the operating system 204 for user interface and file management operations, for instance. Examples of operating systems include versions of the Microsoft® Windows® operating system, available from Microsoft Corp., of Redmond, Wash., as well as versions of the LINUX, UNIX, and other operating systems.

The computer programs 206 are thus the programs that run on the computer system 100 through the operating system 204. The programs 206 are specifically made up of tasks 210, which are also referred to as processes. Each of the computer programs 206 includes one or more of the tasks 210. Each of the tasks 210 is assigned by the operating system 204 to specifically run on, or be executed on, a particular one of the processors 106 of FIG. 1. When a task has completed execution on a given processor, a new execution of the task may begin on the same or a different processor. The operating system 204 specifically includes a special sub-system, referred to as a scheduler 208, that in one embodiment assigns which of the tasks 210 are to be executed on which of the processors 106, as particularly described later in the detailed description.

The operating system 204 further allocates memory for each of the tasks 210. Each task is allocated two types of memory: virtual memory, and actual physical memory. The virtual memory is the maximum amount of memory needed by the task in order to execute properly, but which does not necessarily all correspond to physical memory of the computer system 100. For example, the memory 104 of FIG. 1 is physical memory, which is actual hardware memory, such as semiconductor random-access memory (RAM), and which is accessible by processors 106 that are local to the memory 104. By comparison, virtual memory refers to the amount of addressable memory within the system 100, which may be greater in amount than the physical memory of the computer system 100. The contents of the excess of the virtual memory as compared to the physical memory is stored within a storage device, like a hard disk drive, and read into the physical memory as needed. Therefore, the computer system 100 may include a hard disk drive, or another type of storage device, for storing such excess virtual memory. However, such a storage device is not depicted in FIG. 1 for illustrative simplicity.

For example, as described in the background section, there may be four gigabytes of addressable memory, which means that there is a total of four gigabytes of differently addressable memory locations within the system. However, there may be only three gigabytes of actual physical memory, divided among the memories 104A, 104B, 104C, and 104D of FIG. 1. When a memory location is requested that has an address not currently corresponding to a memory location within actual physical memory, then this means that the requested memory location resides on a storage device, such as a hard disk drive.

The contents of a memory location within the actual physical memory are written to the storage device, and the contents of the requested memory location are read from the storage device into the now-vacant memory location within the actual physical memory. In this way, the computer system 100 is able to have more addressable memory than actual physical memory, by swapping information to and from a storage device as needed.

Figure 3:
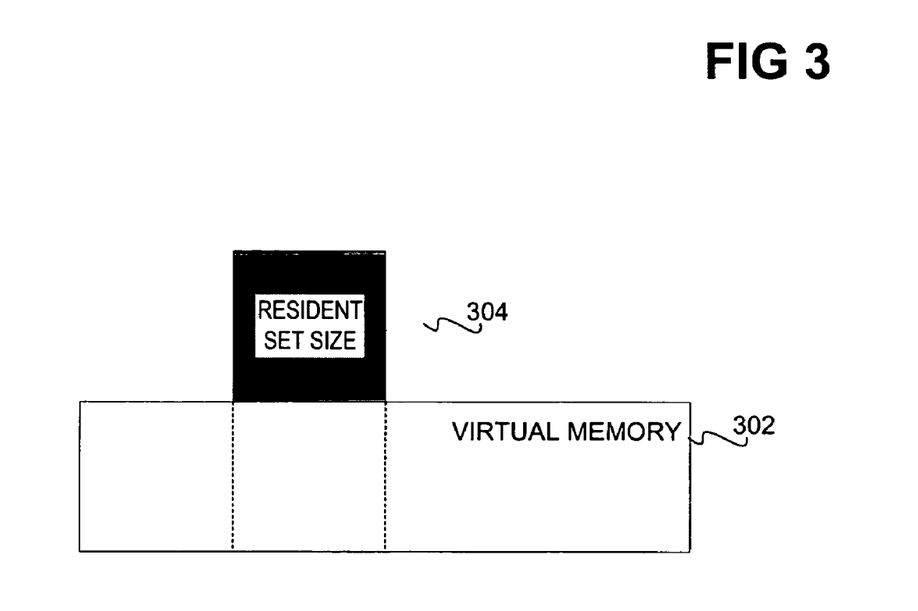
FIG. 3 is a diagram illustratively depicting the resident set size of a task as compared to the virtual memory allocated to the task, according to an embodiment of the invention.

FIG. 3, therefore, shows the relationship between the virtual memory allocated to a given task, as compared to the actual physical memory allocated to a given task, according to an embodiment of the invention. The virtual memory 302 allocated to the task is an amount of addressable memory within the computer system 100. Not all of this memory, however, may correspond to portions of the actual physical memory 104 of FIG. 1. Rather, only a resident set size 304 resides within the actual physical memory 104 at any given time. That is, the resident set size 304 is the amount of actual physical memory, such as a portion of the memory 104, that is allocated to the task. The resident set size 304 is smaller than (or equal to) the virtual memory 302, since it represents one part of the virtual memory 302.

When information is needed that resides within a memory location at a memory address corresponding to the portion of the virtual memory 302 that is not currently within the allocated physical memory represented by resident set size 304, then the contents of this memory location are read from a storage device. For example, other information currently stored within a memory location of the allocated physical memory for the task, as represented by the resident set size 304, is written to the storage device. The requested information is then read from the storage device to this newly vacant memory location within the allocated physical memory for the task. It is noted that the physical memory allocated for the task, as represented by the resident set size 304, may be divided among the memories 104A, 104B, 104C, and 104D of FIG. 1. That is, some of the allocated physical memory may be located at the memory 104A, some may be located at the memory 104B, and so on, such that there may be no one processor that is local to all of the physical memory that has been allocated to the task.

Figure 4:
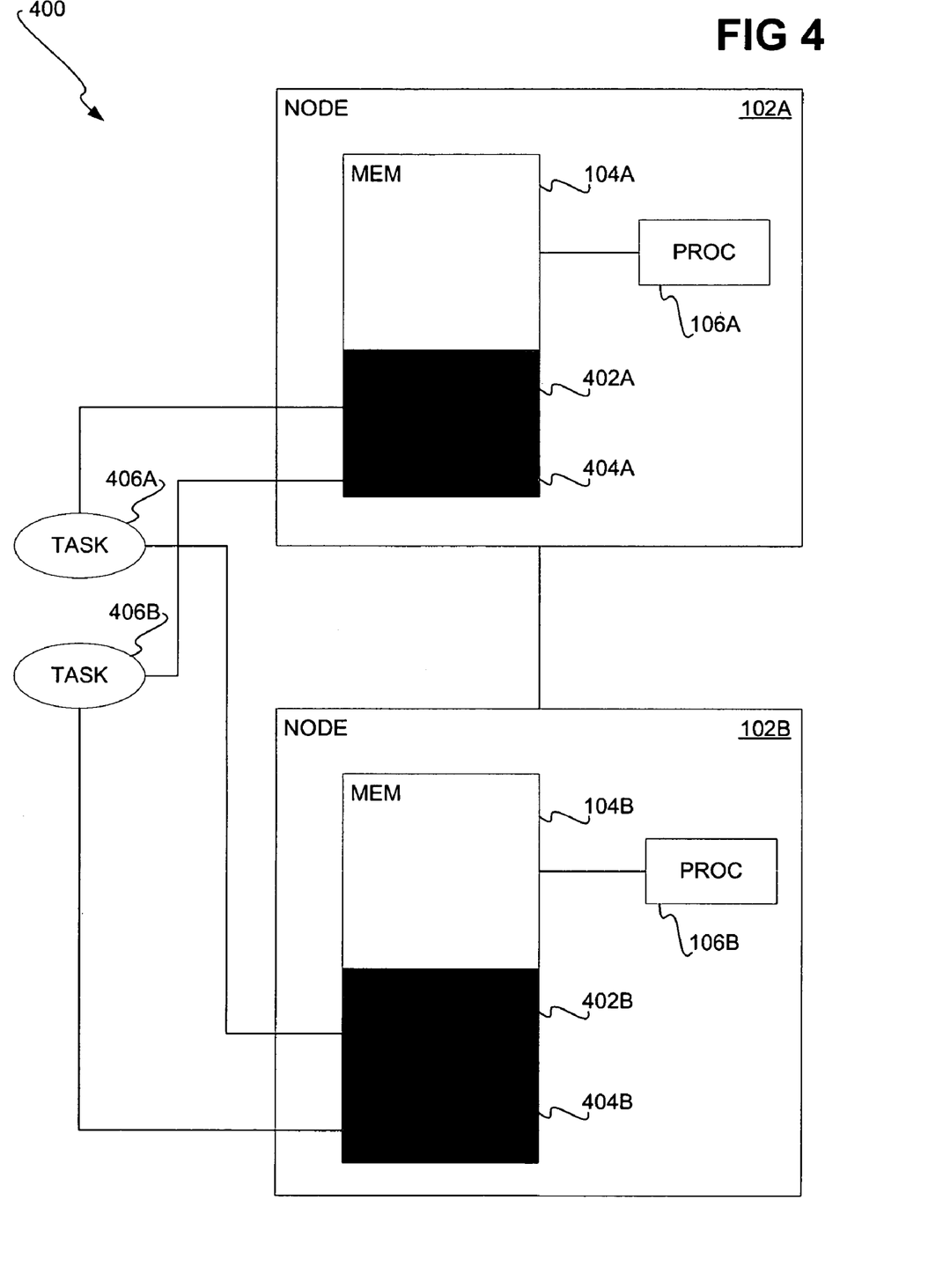
FIG. 4 is a diagram depicting how tasks are assigned to processors based on their resident set sizes and the locational information of the physical memory allocated to the tasks, according to an embodiment of the invention.

FIG. 4 shows a scenario 400 depicting examples of how tasks are assigned to processors, such by the scheduler 208 of the operating system 204 of FIG. 2, according to an embodiment of the invention. For purposes of illustrative and descriptive clarity, only two of the nodes 102 are depicted in the scenario 400: the node 102A and the node 102B. Furthermore, the caches 108 are not depicted in FIG. 4. A first task 406A has been allocated physical memory 402A that is part of the memory 104A local to the processor 106A and to the node 102A, as well as physical memory 402B that is part of the memory 104B local to the processor 106B and to the node 102B. The physical memories 402A and 402B are collectively referred to as the physical memory 402 allocated to the first task 406A. A second task 406B has been allocated physical memory 404A that is part of the memory 104A local to the processor 106A and to the node 102A, as well as physical memory 404B that is part of the memory 104B local to the processor 106B and to the node 102B. The physical memories 404A and 404B are collectively referred to as the physical memory 404 allocated to the second task 406B.

The size of the physical memory 402 allocated to the task 406A is greater than the size of the physical memory 404 allocated to the task 406B in the scenario 400. Furthermore, the size of the physical memory 402B local to the processor 106B and to the node 102B and allocated to the task 406A is greater than the size of the physical memory 404B local to the processor 106B and to the node 102B and allocated to the task 406B. The size of the physical memory 402B is slighter larger than the size of the physical memory 402A, such that the physical memory 402B represents a little more than one-half of the physical memory 402 allocated to the task 406A. By comparison, the size of the physical memory 404B is greater than the size of the physical memory 404A, such that the physical memory 404B represents more than one-half of the physical memory 404 allocated to the task 406B.

The tasks 406A and 406B are collectively referred to as the tasks 406. For purposes of the example of the scenario 400, both the tasks 406 are requesting to be assigned to the processor 106B for execution thereon, or otherwise have been deemed as should be run on the processor 106B for execution thereon. For instance, it may have already been determined that both the tasks 406 should be executed on the processor 106B. This determination is made based on the resident set sizes of the tasks 406—that is, the actual physical memories 402 and 404 assigned to the tasks 406A and 406B, respectively—and based on the locational information regarding the amounts of these physical memories allocated to the tasks 406 (i.e., where these amounts of physical memory are located relative to different nodes or processors). Each of the tasks 406 is in particular attempted to be assigned by the scheduler 208 of FIG. 2 to the processor that is closest to a largest portion of its allocated physical memory.

For both of the tasks 406, this processor is the processor 106B. Of the physical memory 402 allocated to the task 406A, as specified by resident set size, the amount of physical memory 402B that is closest or local to the processor 106B is greater than the amount of physical memory 402A that is closest or local to the processor 106A, as specified by locational information. Similarly, of the physical memory allocated to the task 406B, as specified by resident set size, the amount of physical memory 404B that is closest or local to the processor 106B is greater than the amount of physical memory 404A that is closest or local to the processor 106A, as specified by locational information.

However, for purposes of the example of the scenario 400, it is deemed that the processor 106B is currently at near maximum capacity, and can accommodate assignment of only one of the tasks 406, and not both of them. Therefore, both of the tasks 406 cannot be assigned to the processor 106B, even though the processor 106B is the processor that is local or closest to the largest portion of allocated physical memory for each of the tasks 406. As a result, the scheduler 208 of FIG. 2 determines which of the tasks 406 to actually assign to the processor 106B for execution thereon, by performing a tie-breaking methodology, two examples of which are now described.

In one embodiment, the scheduler 208 of FIG. 2 determines which of the tasks 406 to assign to the processor 106B based on resident set size and locational information, specifically assigning the task that has a greater amount of allocated physical memory local and closest to the processor 106B. Of all the physical memory 402 allocated to the task 406A, as specified by resident set size, the physical memory 402B is local and closest to the processor 106B, as specified by locational information. Of all the memory 404 allocated to the task 406B, as specified by resident set size, the physical memory 404B is local and closest to the processor 106B, as specified by locational information. Because the amount of physical memory 402B is greater than the amount of physical memory 404B, the scheduler thus assigns the task 406A to the processor 106B in this embodiment of the invention.

In another embodiment, the scheduler 208 of FIG. 2 determines which of the tasks to assign to the processor 106B based on resident set size and locational informational differently, specifically assigning the task that has a greater percentage of its allocated physical memory local and closest to the processor 106B. Of all the physical memory 402 allocated to the task 406A, as specified by resident set size, the physical memory 402B is local and closest to the processor 106B, as specified by locational information, and the physical memory 402B represents slightly more than fifty percent of the total physical memory 402 allocated to the task 406A. Of all the physical memory 404 allocated to the task 406B, as specified by resident set size, the physical memory 404B is local and closest to the processor 106B, as specified by locational information, and the physical memory 404B represents much more than fifty percent of the total physical memory 404 allocated to the task 406B. Because the percentage of the physical memory 404B relative to the total allocated physical memory 404 is greater than the percentage of the physical memory 402B relative to the total allocated physical memory 402, the scheduler thus assigns the task 406B to the processor 106B in this embodiment of the invention.

Most generally, then, the scheduler 208 of FIG. 2 first determines which processor to assign each task to minimize access to remote physical memory when the processor that would be assigned is executing the task, if the tasks have not themselves requested execution on a particular processor. This is accomplished by attempting to assign each task to the processor that is closest or local to a greatest portion of the physical memory allocated to the task, based on resident set size and locational information of the physical memory allocated to the task. However, the scheduler 208 may determine that a given processor should execute a number of tasks, but the processor does not have the capacity to accommodate all of these tasks. In such instances, the scheduler 208 has to determine which of these tasks to assign to the given processor in question by performing either tie-breaking methodology described in the previous two paragraphs.

For example, the scheduler 208 may assign to the processor those tasks having the greatest amount of allocated physical memory that is local to the processor, as has been described. Alternatively, the scheduler 208 may assign to the processor those tasks having the greatest percentages of their allocated physical memory local to the processor, as has also been described. In either case, the scheduler 208 first attempts to assign each task to the processor that is closest or local to a largest portion of the task's allocated physical memory, and one of the tie-breaking methodologies comes into play only when more than one task should be assigned to the same processor, and that processor cannot accommodate assignment of all the tasks.

Figure 5:
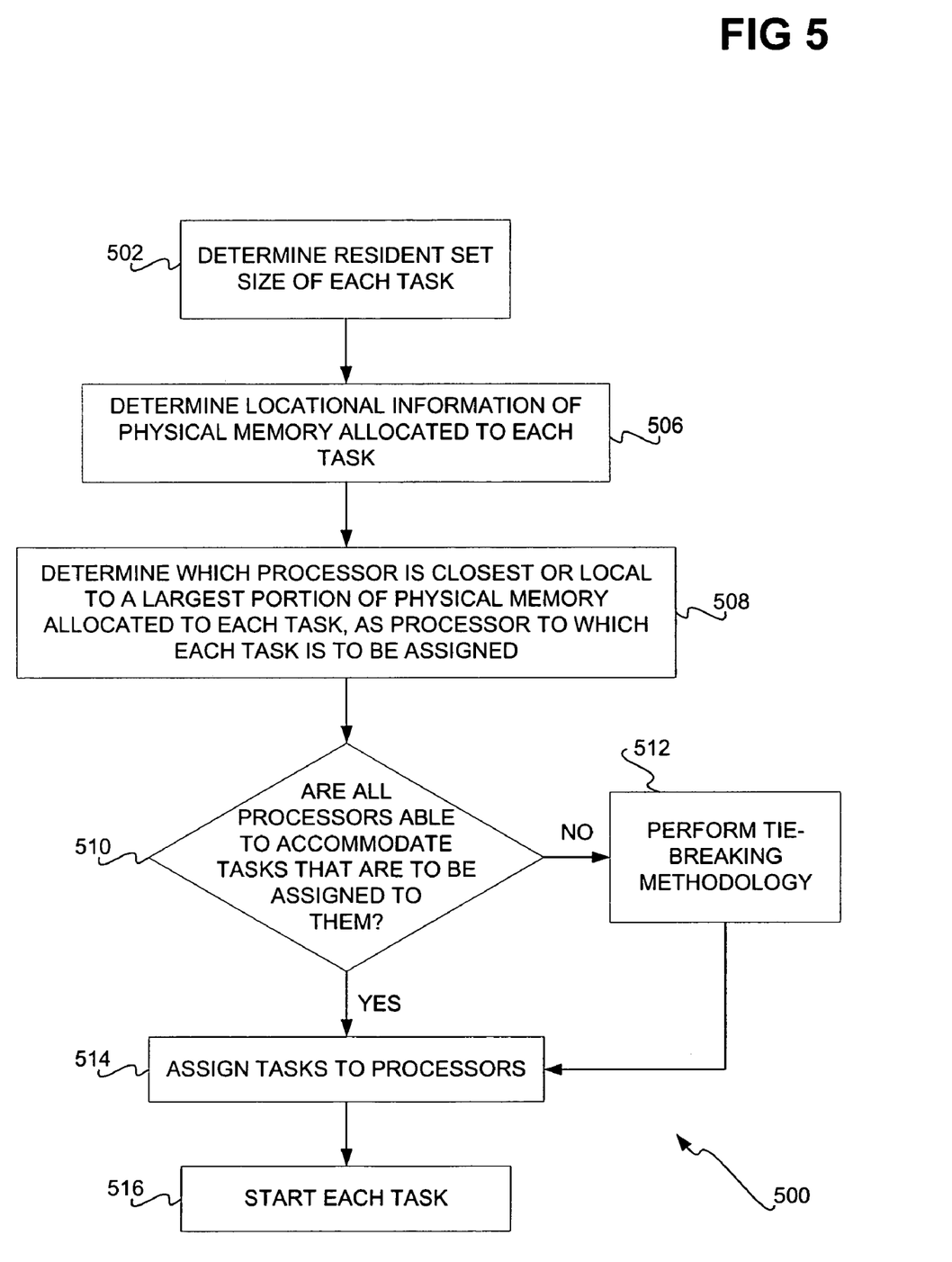
FIG. 5 is a flowchart of a method for assigning tasks to processors for execution thereon, according to an embodiment of the invention, and is suggested for printing on the first page of the patent.

FIG. 5 shows a method 500 for assigning tasks to processors, based on resident set sizes of the tasks specifying the amounts of physical memory allocated to them and based on locational information of the amounts of physical memory allocated to the tasks, according to an embodiment of the invention. The method 500 may be performed in whole or in part by the operating system 204 of FIG. 2, such as by the scheduler 208 thereof. The method 500 of FIG. 5 is consistent with the example for assigning tasks to processors that has been described in relation to FIG. 4.

First, for each of a number of tasks to be assigned to a processor, the method 500 determines the resident set size of the task (502). The resident set size is typically a parameter associated with the task, or process, and therefore can be determined specifically by looking up this parameter. The operating system 204 may have an approach to limit the size of the resident set size, based on the number of other tasks currently running, the total amount of physical memory within the multiple-processor computer system, and the amount of physical memory that has not been allocated. The resident set size is the amount of physical memory that is currently allocated to the task.

As each task is allocated an amount of physical memory, locational information of the physical memory allocated to each task is determined or retained (506). Determining locational information of the physical memory allocated to each task by the scheduler 208 is thus made relatively simple. For instance, if there are two processors within the system, and a total of one-hundred megabytes of physical memory has been allocated, reviewing locational information of this allocated physical memory may reveal that sixty megabytes of the physical memory allocated is closest or local to a first processor, and the other forty megabytes is closest or local to the second processor. Determining locational information can be specifically accomplished by examining the ranges of memory addresses allocated as a task's physical memory. Because it is a priori known the memory addresses that are local to each processor, comparing the ranges of memory addresses allocated to a task against the memory addresses known to be local to each processor yields the amount of a task's allocated physical memory is local to each processor. The locational information of the physical memory of a task thus specifies the location of this memory relative to one or more processors, or nodes, such as the amount of physical memory of a task that is local to each processor or each node.

The method 500 next determines which processor is closest or local to a largest portion of the physical memory allocated to each task, as the processor to which each task should or is to be assigned (508). In the example of the previous paragraph, for instance, the first processor that is local to the sixty-megabyte portion of physical memory allocated to the task in question is the processor to which this task should be assigned. Such preliminary assignment in 508 is made so as to minimize access to remote physical memory. For instance, the first processor that is local to the sixty-megabyte portion of physical memory allocated to the task in question at most has to remotely access the forty-megabyte portion of physical memory that is local to the second processor. By comparison, the second processor that is local to the forty-megabyte portion of physical memory allocated to this task at most has to remotely access the sixty-megabyte portion of physical memory that is local to the first processor. Therefore, assigning the task to the first processor is ideal, because it is more likely minimize remote memory accesses within the multiple-processor system, assuming equal potential of remote memory access across all of the physical memory allocated to the task.

The method 500 determines, however, whether all the processors are able to accommodate all the tasks that are to be assigned to them (510). For instance, in some situations a processor may not be able to accept assignments of all the processors earmarked for assignment to it. The processor may be operating at near-full capacity, such that it can only accept one or a few—or none—of the tasks that have been determined in 508 as should be assigned to the processor. In this case, the method 500 performs one of the tie-breaking methodologies that have been described (512). For example, those tasks have the greatest amount of allocated physical memory local to the processor in question may be assigned to this processor. Alternatively, those tasks have the greatest percentage of total allocated physical memory local to the processor in question may be assigned to this processor.

If all the processors are able to accommodate the tasks that are to be assigned to them, or once tie-breaking methodologies have been otherwise performed, the tasks are assigned to processors for execution thereon (514). Thus, assignment of tasks to processors is based on the resident set sizes of the tasks, and the locational information of the amounts of physical memory allocated to the tasks. Each task is attempted to be assigned to the processor that is closest to the largest portion of the physical memory allocated to the task. If this is not possible, because, for instance, a given processor cannot accept assignment of the task, then tie-breaking methodologies are performed to limit the number of tasks assigned to a given processor. The method 500 concludes by starting each task on its assigned processor (516), where the task also has already been allocated sufficient physical memory to properly run or execute on its assigned processor.

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. For instance, embodiments of the invention have been described regarding how to select, from a number of tasks, which processor a task is best suited for, by utilizing resident set size and locational information. In other embodiments, the resident set size and locational information of each of a number of tasks can be employed to determine which task to execute first on a selected processor, when this processor has to select the task to execute first from the number of tasks. It is manifestly intended that this invention be limited only by the claims and equivalents thereof.

I claim:

1. A method comprising:

for each task of a plurality of tasks to be run on a plurality of processors of a system including a first processor and a second processor, determining a resident set size of the task specifying an amount of physical memory allocated to the task where the amount of physical memory allocated to the task has been divided over local physical memories of the processors such that the first processor has a first amount of local physical memory allocated to the task and the second processor has a second amount of local physical memory allocated to the task where the first amount is different than the second amount, and determining locational information of the amount of physical memory allocated to the task with respect to the plurality of processors where the locational information specifies that the amount of physical memory allocated to the task includes the first amount of local physical memory of the first processor that is allocated to the task and the second amount of local physical memory of the second processor that is allocated to the task; and assigning each task to one processor of the plurality of processors on which to be run, based on the resident set size of the task and the locational information of the amount of physical memory allocated to the task, each task attempted to be assigned to the one processor that is closest to a largest portion of the amount of physical memory allocated to the task, wherein where the first amount of local physical memory allocated to the task is greater than amounts of all other of the local physical memories of the processors allocated to the task, including the second amount of local physical memory allocated to the task, the task is assigned to the first processor, and wherein where the second amount of local physical memory allocated to the task is greater than amounts of all other of the local physical memories of the processors allocated to the task, including the first amount of local physical memory allocated to the task, the task is assigned to the second processor.

2. The method of claim 1, wherein a number of the tasks are determined to be run on one of the processors, but the processor is unable to run all of the tasks, such that the tasks that are assigned to run on the processor are those having greatest amounts of allocated physical memory closest to the processor.

3. The method of claim 1, wherein a number of the tasks are determined to be run on one of the processors, but the processor is unable to run all of the tasks, such that the tasks that are assigned to run on the processor are those having greatest percentages of their allocated physical memory closest to the processor.

4. The method of claim 1, wherein assigning each task the one processor of the plurality of processors on which to be run based on the resident set size of the task and the locational information of the amount of physical memory allocated to the task comprises predictively assigning each task the one processor on which to be run so as to minimize accesses to physical memory located remote to the one processor.

5. The method of claim 1, wherein the amount of physical memory allocated to each task of the plurality of tasks comprises first physical memory local to a given processor of the plurality of processors and second physical memory remote to the given one processor, the first physical memory greater in amount than the second physical memory, such that assigning each task the one processor of the plurality of processors on which to run comprises assigning each task the given processor having as local memory the first physical memory allocated to the task where possible.

6. The method of claim 1, wherein the physical memory allocated to each task as specified by the resident set size of the task is non-cache physical memory.

7. The method of claim 1, wherein the method is performed by a scheduler of an operating system.

8. A system comprising:
a plurality of processors;
physical memory divided into a plurality of memory portions corresponding to the plurality of processors, the memory portion corresponding to each processor being local to the processor and remote to all other of the plurality of processors; and
an operating system to assign the task to one processor of the plurality of processors based on a resident set size of the task and locational information regarding an amount of physical memory allocated to the task based on the resident set size of the task,
where the amount of physical memory allocated to the task has been divided over local physical memories of the processors such that the first processor has a first amount of local physical memory allocated to the task and the second processor has a second amount of local physical memory allocated to the task where the first amount is different than the second amount,
where the locational information specifies that the amount of physical memory allocated to the task includes the first amount of local physical memory of the first processor that is allocated to the task and the second amount of local physical memory of the second processor that is allocated to the task,
wherein where the first amount of local physical memory allocated to the task is greater than amounts of all other of the local physical memories of the processors allocated to the task, including the second amount of local physical memory allocated to the task, the task is assigned to the first processor, and
wherein where the second amount of local physical memory allocated to the task is greater than amounts of all other of the local physical memories of the processors allocated to the task, including the first amount of local physical memory allocated to the task, the task is assigned to the second processor.

9. The system of claim 8, wherein the operating system is to assign the task to the one processor such that the one processor assigned is local to a largest portion of the amount of the physical memory allocated to the task.

10. The system of claim 8, wherein the operating system is to further allocate an amount of the physical memory to a second task based on a resident set size of the second task and to assign the second task to one of the processors based on the resident set size of the second task and locational information regarding the amount of physical memory allocated to the second task.

11. The system of claim 10, wherein the task and the second task are to be assigned to a given processor but the given processor is unable to run both the task and the second task, the operating system assigning to the given processor either the task or the second task that has a greatest amount of the physical memory allocated local to the given processor.

12. The system of claim 10, wherein the task and the second task are to be assigned to a given processor but the given processor is unable to run both the task and the second task, the operating system assigning to the given processor either the task or the second task that has a greatest percentage of the physical memory allocated local to the given processor.

13. The system of claim 8, wherein the operating system comprises a scheduler to assign the task to the one processor based on the resident set size of the task and the locational information regarding the amount of physical memory allocated to the task.

14. The system of claim 8, wherein the physical memory comprises non-cache physical memory.

* * * * *